United States Patent Office 3,178,413
Patented Apr. 13, 1965

3,178,413
20(18)-CYCLOHEMIKETALS OF 18-HYDROXY-20-OXO PREGNANES AND PROCESS THEREFOR
Albert Wettstein, Riehen, and Julius Schmidlin, Basel, Switzerland, assignors to Ciba Corporation, a corporation of Delaware
No Drawing. Filed Aug. 26, 1960, Ser. No. 52,050
Claims priority, application Switzerland, Aug. 28, 1959, 77,487
22 Claims. (Cl. 260—239.55)

This invention provides a new process for introducing a 21-hydroxyl group into 18-hydroxy-20-oxo-pregnanes which are not substituted in the 21-position.

In the process of this invention a 20(18)-cyclohemiketal of a 21-unsubstituted 18-hydroxy-20-oxo-pregnane is treated with an esterifying agent, acid is split off the 20-esters formed and in the resulting $\Delta^{20}$-18:20-oxido-pregnene the 20:21-double bond is hydroxylated to obtain the 20(18)-cyclohemiketal of the corresponding 21-hydroxy-20-oxo-pregnane compound.

The starting materials can also be looked upon tautomerically as the free 18-hydroxy-20-keto-pregnane compounds. They are new or can be prepared as shown below. They may contain further substituents, advantageously free or functionally converted hydroxyl or oxo groups such as esterified hydroxyl groups or ketalized oxo groups, in the 3-position and, if desired, also in the 11-position. The ester groups are preferably derived from acids of the aliphatic, aromatic araliphatic, alicyclic, and heterocyclic series having from 1 to 20 carbon atoms. They may be saturated or unsaturated, for example, they may contain a double bond starting from the 4- or 5-carbon atom. As starting materials there are preferably used compounds of the formula

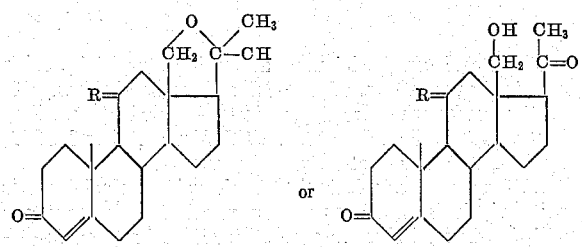

in which R represents two hydrogen atoms or a free or esterified hydroxyl group and a hydrogen atom, or an oxo group.

Inasmuch as the starting materials, such as those mentioned above with oxygen in 11-position, are new, they can be obtained, for example, by starting from an 18-mono-acylate of an 11-oxygenated-18-hydroxy-20-keto-pregnane compound described in U.S. patent application No. 845,095, filed October 8, 1959, by Albert Wettstein et al., according to the following scheme which refers to the particular case of the 11,18-dihydroxy-progesterone

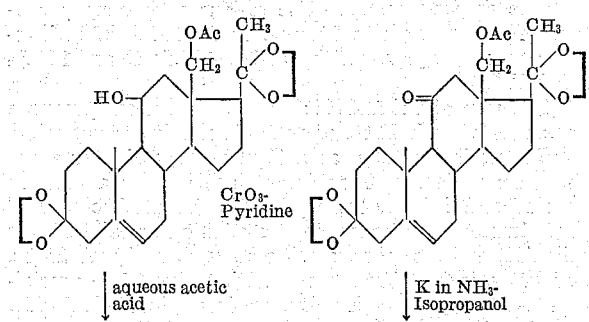

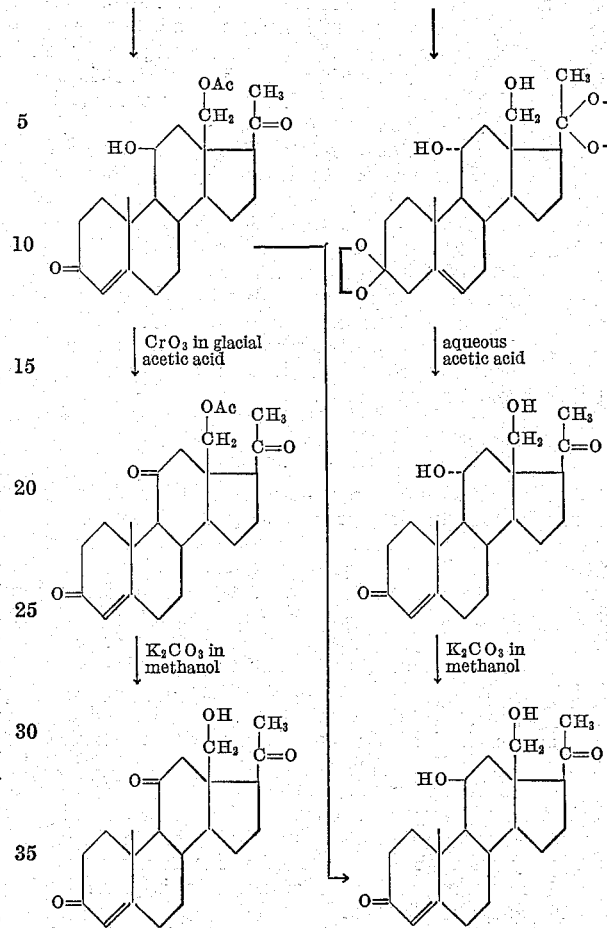

For esterifying the starting materials there are used acid halides or anhydrides, for example, of aliphatic or advantageously aromatic sulfonic or carboxylic acids, such as methane sulfonic acid, benzene sulfonic acid, paratoluene sulfonic acid, or benzoic acid or anthraquinone-$\beta$-carboxylic acid. It is of advantage to work in the presence of a base, for example, pyridine.

In the 20-hemiketal-esters so obtained the acid radical in the 20-position is eliminated in a surprisingly smooth reaction with the formation of a double bond in the 20:21-position. The splitting off of the acid radical may be carried out with the aid of heat and/or by the action of a base. In the case of alkyl- or aryl-carboxylic acid esters the pyrolysis is advantageously carried out under reduced pressure in the presence or absence of a diluent. Alkyl- or aryl-sulfonic acid esters are advantageously split in the process of this invention by the action of bases. As splitting agents there are used more especially tertiary amines, such as 2:4:6-trimethylpyridine and N:N-dimethylaniline, or alkali hydroxides or alkoxides, for example, caustic soda or sodium methylate, or hydroxides or oxides of alkaline earth metals or earth metals, for example, barium hydroxide or aluminum oxide. The esterification of the 20-hydroxyl group and the splitting may also be carried out in a single operation.

The hydroxylation of the $\Delta^{20}$-18:20-oxido-pregnenes is advantageously carried out with controlled amounts of a 5- to 8-valent metal oxide, for example, osmium tetroxide or tungsten trioxide, advantageously in conjunction with an agent yielding oxygen, such as hydrogen peroxide, and an aminoxide peroxide, for example, triethyl-aminoxide peroxide or N-methyl-morpholinoxide peroxide, or an aryl-iodoso acylate, for example, phenyl-iodoso-acetate. The hydroxylation reaction is advantageously carried out in the presence of pyridine.

The invention also includes any modification of the process in which there is used as starting material a compound obtainable as an intermediate product at any stage of the process and the remaining stages of the process are carried out, or in which the process is interrupted at any stage, or in which the starting material is formed under the reaction conditions.

The products of the process are therapeutically valuable, having a mineralocorticoid activity and some of them are new. They may used, for example, for the treatment of Addison's disease, states of shock and asthenia. Special mention may be made of the 18-hydroxycorticosterone and its esters which have a pronounced mineralocorticoid activity and 18-hydroxy-11-dehydrocorticosterone and its esters. The compounds obtained by the present process may also be used for the preparation of other 18-oxygenated corticosteroids having suprarenal cortex hormone-activity.

The new compounds obtained by the present process can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzyl-alcohols, gums, polyalkylene glycols, cholesterol or other known carries. The pharmaceutical preparations can be in the form, for instance, of tablets or dragees or in liquid form as solutions, suspensions, or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way. The content of active substances in these preparations, such as in an ampoule, is preferably 0.1–200 mg., or 0.03–60%.

The following example illustrates the invention: it being understood that the proportions and temperature conditions and especially the solvents may be varied without departing from the scope of the invention:

Example

A solution of 172.5 mg. of d:1-$\Delta^4$-3:11:20-trioxo-18-hydroxy-pregnene or its 20-hemiketal and 475 mg. of para-tosyl chloride in 5 cc. of anhydrous pryridine is allowed to stand for 6 days at 0° C. The reaction mixture is then diluted with benzene, agitated at 0–5° C. in succession with 2 N-hydrochloric acid, 0.1 N-solution of sodium hydrogen carbonate and water, the solution is dried with sodium sulfate, and then concentrated by evaporation in vacuo to a volume of about 25 cc. The concentrate so obtained is chromatographed on a column of 12.5 grams of silica gel prepared in benzene. The constituents dissolved with pure benzene and mixtures of benzene and ethyl acetate of increasing ethyl acetate content are continuously examined for their infra-red absorption. The eluates that absorb strongly in the region 8.4–8.6$\mu$ are combined and consist of crude d:1-$\Delta^4$-3:11-dioxo-18:20-oxido-20-tosyloxy-pregnene, which is subjected to the splitting reaction without further purification.

A solution of 50 mg. of d:1-$\Delta^4$-3:11-dioxo-18:29-oxido-20-tosyloxy-pregnene in 1 cc. of 2:4:6-trimethyl-pyridine and 4 cc. of meta-xylene is boiled under reflux for 16 hours in an atmosphere of nitrogen. When the reaction is finished, the solution is evaporated under a high vacuum pump at a bath temperature of 40° C., the radical is dissolved in benzene, the solution is washed in succession with 1.5 N-ortho-phosphoric acid, an 0.5 N-solution of sodium hydrogen carbonate, and water, dried with sodium sulfate, and the dried solution is chromatographed on a column of 5 grams of silica gel prepared with benzene. The column is eluted first with benzene, then with mixtures of benzene and ethyl acetate of increasing ethyl acetate content, and the fractions obtained are examined for infra-red absorption in the region 7.85–8.15$\mu$. The fractions that absorb strongly in this region are combined. They represent crude d:1-$\Delta^{4:20}$-3:11-dioxo-18:20-oxido-pregnadiene, which can be used directly for the following hydroxylation.

18.2 mg. of the d:1-$\Delta^{4:20}$-3:11-dioxo-18:20-oxido-pregnadiene are dissolved in 4.2 cc. of benzene and 0.11 cc. of pyridine and 16 mg. of osmium tetroxide are added, the vessel being rinsed out with 1.4 cc. of benzene. After stirring the mixture for 14 hours at room temperature the solution is concentrated in vacuo to about 1.4 cc., 5.6 cc. of methanol and 5.6 cc. of an 0.25 molar aqueous solution of ammonium sulfite are added, and the whole is agitated for one hour. There are then added 100 mg. of kieselguhr, the mixture is filtered with suction, and the filtrate is evaporated in vacuo to a volume of about 3 cc. The hydroxylation product is taken up in methylene chloride, the solution is washed with water, and then dried with sodium sulfate and evaporated. For purification the residue is dissolved in methylene chloride and applied to 6 sheets of Whatman paper No. 1 (18.5 by 45 cm.; washed with chloroform and methanol) and chromatographed in the solvent system Bl$_1$ of Bush. The zone localized on the basis of ultraviolet absorption of R$_f$-values from 0.09 to 0.16 is cut out, eluted with methanol, and the combined eluate is cautiously evaporated in vacuo. The residue is extracted in portions with a total of 18 cc. of benzene, the combined extract is evaporated in vacuo first to a volume of about 1.6 cc., then filtered through a small cotton wool column, and the clear filtrate is finally evaporated completely. The lake that remains behind crystallizes after being taken up in a small amount of acetone and cautiously treated with ether. There is obtained pure d:1-$\Delta^4$-3:11:20-trioxo-18:21-dihydroxy-pregnene or its 20-hemiketal in the form of round clusters melting at 158–160.5° C.

The starting material used above is obtained by using as starting material d:1-$\Delta^4$-3:20-dioxo-11$\beta$-hydroxy-18-acetoxy-pregnene, the preparation of which is described in the U.S. application No. 845,095, filed October 8, 1959, by Albert Wettstein et al., as follows:

31.7 cc. of a solution of chromic acid in glacial acetic acid which is 0.079-normal in relation to oxygen are added, while stirring, to a solution of 971 mg. of d:1-$\Delta^4$-3:20-dioxo-11$\beta$-hydroxy-18-acetoxy-pregnene melting at 187.5–189° C. in 50 cc. of glacial acetic acid. After one half, one, two and four hours further additions of chromic acid solution of 3.2 cc. each and of the same concentration are added, and the excess of oxidizing agent is then decomposed after a reaction period of 6 hours with 1 cc. of methanol. The solution is allowed to stand until the following day, and is then evaporated in vacuo to a syrupy consistency, the crude product is taken up in methylene chloride, the solution is washed ice-cold with 0.5 N-sulfuric acid, 0.5 N-solution of sodium hydrogen carbonate and with water, the solution is then dried with sodium sulfate and evaporated. The residue after recrystallization from ether yields 831 mg. of d:1-$\Delta^4$-3:11:20-trioxo-18-acetoxy-pregnene melting at 153–154.5° C. and 161.5–162.5° C.

387 mg. of d:1-$\Delta^4$-3:11:20-trioxo-18-acetoxy-pregnene are agitated with 50 cc. of an 0.4 N-solution of potassium carbonate in methanol of 75% strength, and after a few minutes a clear solution is obtained. After a reaction period of 2½ hours the excess of carbonate is converted into hydrogen carbonate by the addition of solid carbon dioxide, and the mixture, after being diluted with 25 cc. of water, is freed from methanol in vacuo. The precipitated crude product is taken up in methylene chloride, the solution is washed with water, dried with sodium carbonate, and evaporated. The residue is subjected to chromatographic separation on 200 sheets of Whatman paper No. 1 (18.5 x 45 cm.; washed with chloroform and methanol) in the solvent system formamide/benzene by the method of Zaffaroni. The zone of $R_f$-value of 0.40 to 0.48 localized on the basis of ultra-violet absorption is eluted with an aqueous solution of tetrahydrofuran of 20% strength. The eluate is evaporated in vacuo, the aqueous residue is extracted with benzene, the solution is dried with sodium sulfate and the solvent is distilled off in vacuo to yield a yellowish residue which crystallizes from acetone after the addition of ether. There is obtained pure d:1-$\Delta^4$-3:11:20-trioxo-18-hydroxy-pregnene or its 20-hemiketal melting at 164.5–166° C.

By using as starting material in this example the corresponding 11β-hydroxy compound, the d:1-$\Delta^4$-3:20-dioxo-11β:18-dihydroxy-pregnene or its 20-hemiketal, which is obtainable from d:1-$\Delta^4$-3:20-dioxo-11β-hydroxy-18-acetoxy-pregnene described in the U.S. patent application No. 845,095, filed October 8, 1959, by Albert Wettstein et al. by hydrolysis with potassium carbonate in methanol, there is obtained in an analogous manner by esterification with para-tosyl chloride in pyridine, di:1-$\Delta^4$-3-oxo-11β-hydroxy-18:20-oxido-20-tosyloxy-pregnene. The tosylate so obtained yields in the process described above by treatment with 2:4:6-trimethyl-pyridine, d:1-$\Delta^{4,20}$-3-oxo-11β-hydroxy-18:20-oxido-pregnadiene and the latter, after reaction with osmium tetroxide, yields d:1-$\Delta^4$-3:20-dioxo-11β:18:21-trihydroxy-pregnene or its 20-hemiketal melting at 174–176.5° C.

What is claimed is:

1. Process for the manufacture of the 20(18)-cyclohemiketal of an 18.21-dihydroxy-20-oxo-pregnane compound, wherein the 20(18)-cyclohemiketal of a 21-unsubstituted 18-hydroxy-20-oxo-pregnane is esterified with a member selected from the group consisting of an aliphatic carboxylic acid anhydride, an aliphatic carboxylic acid halide, an aliphatic sulfonic acid anhydride, an aliphatic sulfonic acid halide, an aromatic carboxylic acid anhydride, an aromatic carboxylic acid halide, an aromatic sulfonic acid anhydride and an aromatic sulfonic acid halide, each of which has at most 20 carbon atoms, acid is split off the 20-esters formed with the aid of heat, the resulting $\Delta^{20}$-18:20-oxido-pregnene is hydroxylated with a member selected from the group consisting of a 5- to 8-valent metal oxide and such a metal oxide together with a member selected from the group consisting of hydrogen peroxide, an aminoxide peroxide and a phenyliodoso acylate.

2. Process as claimed in claim 1, wherein esterification is carried out with p-toluene sulfonic acid chloride.

3. Process as claimed in claim 1, wherein a sulfonic acid ester obtained is split off with heat in the presence of a diluent.

4. Process as claimed in claim 1, wherein the $\Delta^{20}$-18:20-oxido-pregnene obtained is reacted with osmium tetroxide.

5. Process as claimed in claim 4, wherein the reaction is carried out in the presence of hydrogen peroxide.

6. Process as claimed in claim 4, wherein the reaction is carried out in the presence of pyridine.

7. Process for the manufacture of the 20(18)-cyclohemiketal of an 18:21-dihydroxy-20-oxo-pregnane compound, wherein the 20(18)-cyclohemiketal of a 21-unsubstituted 18-hydroxy-20-oxo-pregnane is esterified with a member selected from the group consisting of an aliphatic carboxylic acid anhydride, an aliphatic carboxylic acid halide, an aliphatic sulfonic acid anhydride, an aliphatic sulfonic acid halide, an aromatic carboxylic acid anhydride, an aromatic carboxylic acid halide, an aromatic sulfonic acid anhydride and an aromatic sulfonic acid halide, each of which has at most 20 carbon atoms, acid is split off the 20-esters formed with the aid of a basic agent, the resulting $\Delta^{20}$-18:20-oxido-pregnene is hydroxylated with a member selected from the group consisting of a 5- to 8-valent metal oxide and such a metal oxide together with a member selected from the group consisting of hydrogen peroxide and a phenyl-iodoso acylate.

8. Process as claimed in claim 7, wherein esterification is carried out with p-toluene sulfonic acid chloride.

9. Process as claimed in claim 7 wherein a sulfonic acid ester obtained is split off with a basic agent in the presence of a diluent.

10. Process as claimed in claim 7, wherein the $\Delta^{20}$-18:20-oxido-pregnene obtained is reacted with osmium tetroxide.

11. Process as claimed in claim 10, wherein the reaction is carried out in the presence of hydrogen peroxide.

12. Process as claimed in claim 10, wherein the reaction is carried out in the presence of pyridine.

13. A member selected from the group consisting of 20(18)-cyclohemiketal esters of 11β:18-dihydroxy-progesterone and their corresponding 3-ketals, said esters being derived from acids having at most 20 carbon atoms and selected from the group consisting of aliphatic carboxylic acids, aliphatic sulfonic acids, aromatic sulfonic acids, and aromatic carboxylic acids.

14. $\Delta^4$-3-oxo-11β - hydroxy - 18:20 - oxido-20-tosyloxy-pregnene.

15. A member selected from the group consisting of 20(18)-cyclohemiketal esters of 11-oxo-18-hydroxy-progesterone and their corresponding 3-ketals, said esters being derived from acids having at most 20 carbon atoms and selected from the group consisting of aliphatic carboxylic acids, aliphatic sulfonic acids, aromatic sulfonic acids, and aromatic carboxylic acids.

16. $\Delta^4$-3:11-dioxo-18:20-oxido-20-tosyloxy-pregnene.

17. $\Delta^{4,20}$-3-oxo-11β-hydroxy-18:20-oxido-pregnadiene.

18. $\Delta^{4,20}$-3:11-dioxo-18:20-oxido-pregnadiene.

19. A compound of the formula

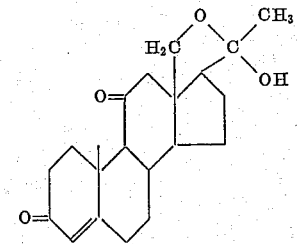

20. A compound of the formula

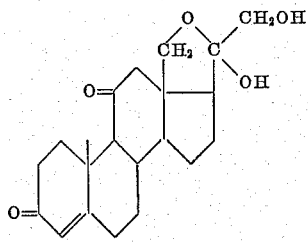

21. A compound of the formula

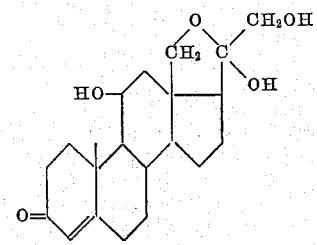

22. A compound of the formula
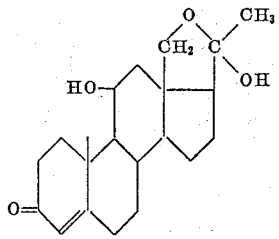
References Cited by the Examiner
UNITED STATES PATENTS
| | | | |
|---|---|---|---|
| 2,904,545 | 9/59 | Reichstein et al. | 260—239.55 |
| 2,986,567 | 5/61 | Reichstein et al. | 260—340.9 |
| 3,007,922 | 11/61 | Georgian et al. | 260—239.5 |
| 3,081,298 | 3/63 | Wettstein et al. | 260—239.55 |
LEWIS GOTTS, *Primary Examiner.*
L. H. GASTON, MORRIS LIEBMAN, *Examiners.*

UNITED STATES PATENT OFFICE
CERTIFICATE OF CORRECTION

Patent No. 3,178,413                      April 13, 1965

Albert Wettstein et al.

It is hereby certified that error appears in the above numbered patent requiring correction and that the said Letters Patent should read as corrected below.

Column 5, line 33, for "18.21-" read -- 18:21- --.

Signed and sealed this 15th day of February 1966.

(SEAL)
Attest:

ERNEST W. SWIDER
Attesting Officer

EDWARD J. BRENNER
Commissioner of Patents